J. J. SHOEMAKER.
FOLDING AUTOMOBILE RIM PROTECTOR.
APPLICATION FILED MAY 18, 1917.
1,267,286.
Patented May 21, 1918.
2 SHEETS—SHEET 1.
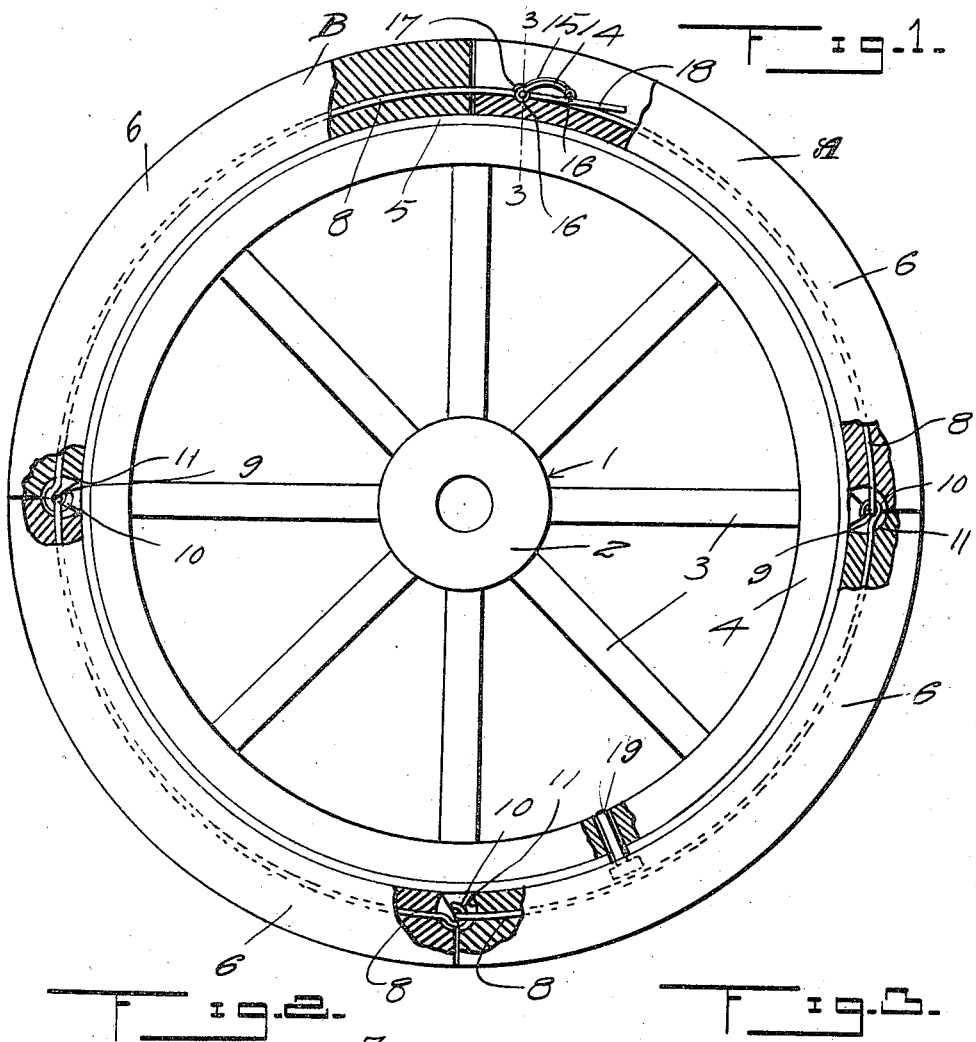
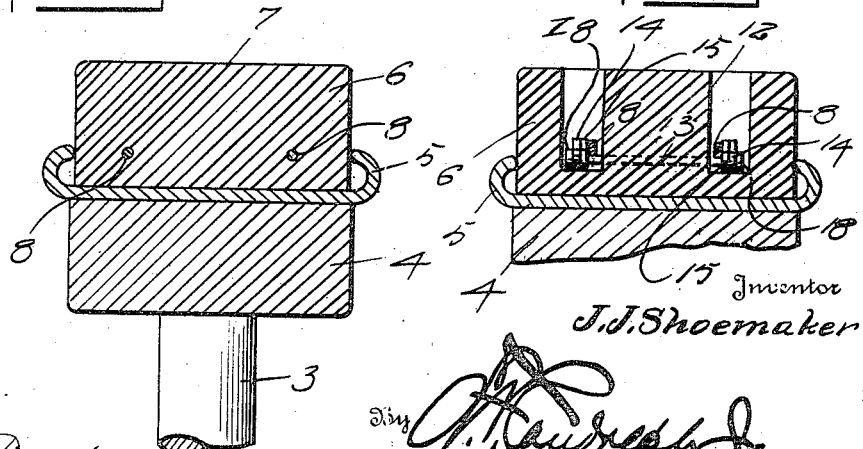

J. J. SHOEMAKER.
FOLDING AUTOMOBILE RIM PROTECTOR.
APPLICATION FILED MAY 18, 1917.
1,267,286.
Patented May 21, 1918.
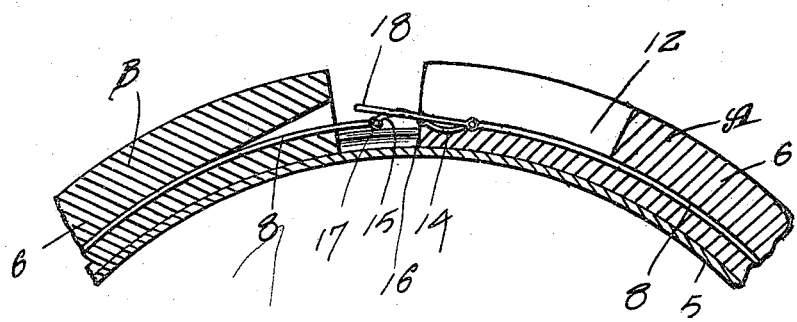
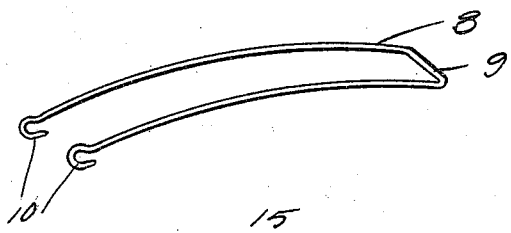
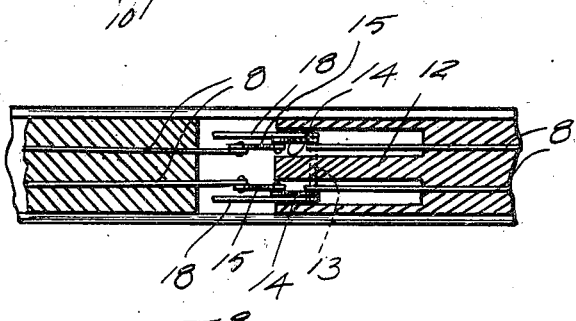
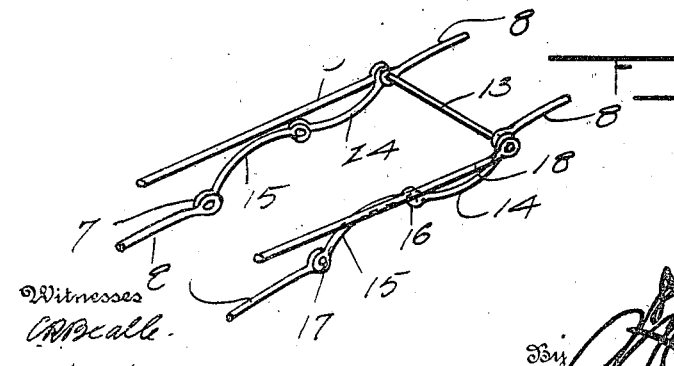

UNITED STATES PATENT OFFICE.

JOSEPH J. SHOEMAKER, OF SAN JOSE, CALIFORNIA.

FOLDING AUTOMOBILE-RIM PROTECTOR.

1,267,286.  Specification of Letters Patent.  Patented May 21, 1918.

Application filed May 18, 1917. Serial No. 169,497.

*To all whom it may concern:*

Be it known that I, JOSEPH J. SHOEMAKER, a citizen of the United States, residing at San Jose, in the county of Santa Clara and State of California, have invented certain new and useful Improvements in Folding Automobile-Rim Protectors; and I do hereby declare the following to be a full, clear, and exact description of the invention, such as will enable others skilled in the art to which it appertains to make and use the same.

This invention relates to a folding automobile rim protector and has for one of its objects the provision of a device of this character, which may be readily applied to the rim of an automobile wheel in case the pneumatic tire or shoe becomes injured so that the automobile may proceed upon its travel without the danger of injuring the rim of the wheel or the mechanism of the automobile.

Another object of this invention is the provision of the protector constructed from a plurality of sections whereby the device may be folded into a compact article while not in use, thus making it possible to store the device in a considerable small space.

A further object of this invention is the provision of means whereby the sections may be tightly clamped together about the rim of a wheel under a single securing operation.

A still further object of this invention is the provision of a folding automobile rim protector of the above stated character, which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a front elevation partly in section of a folding automobile rim protector constructed in accordance with my invention, and illustrating it applied to a wheel, Fig. 2 is a fragmentary transverse sectional view of the same, Fig. 3 is a similar view taken on the line 3—3 of Fig. 1, Fig. 4 is a fragmentary vertical sectional view of the means for tightly clamping the sections of the protector about the wheel, Fig. 5 is a perspective view of one of the connecting members in each of the sections, Fig. 6 is a fragmentary longitudinal sectional view illustrating the means for drawing the sections of the protector in close relation with each other, Fig. 7 is a fragmentary perspective view of the locking means.

Referring in detail to the drawings, the numeral 1 indicates a wheel consisting of a hub 2 having radiating spokes 3 on which the felly 4 is mounted. The felly carries the usual tire rim 5 for retaining the pneumatic shoe or casing upon the felly.

The protector 5 consists of a plurality of sections, which are substantially rectangular in cross section and provided with a tread surface 7. The protector may be constructed from any desired material, suitable for the purpose, such as rubber combined with fabric.

Each of the sections has embedded therein, a substantially U-shaped member 8, which has its web portion 9 disposed outwardly of one end of the section, while the ends of the arm portions are bent to form hooks 10 that are disposed exteriorly of the other end of the section. The hooks 10 are adapted to engage the web 9 of the member 8 of the next adjacent section, whereby the sections are pivotally connected together.

The ends of the sections are provided with recesses 11 for permitting the pivotal connection between the substantially U-shaped members 8 to have free movement. The section A is provided with recesses 12 in which is journaled a transverse rod 13. The transverse rod 13 is journaled to the ends of the arm portions of the U-shaped member 8, which is embedded within the section A. A curved arm 14 is secured to each end of the rod 13 and are pivotally connected to links 15 as at 16. The links 15 are pivotally connected to the ends of the arm portions of the U-shaped member 8, which is embedded within the section B as shown at 17. Levers 18 are secured to the rod 13, which are adapted to be swung in the arc of a circle within the recesses 12 for rotating the rod 13, which swings the arms 14 in the arc of a circle causing the links 15 to move the plurality of sections of the protector together tightly about the felly of the wheel.

A lug 19 is secured to one of the sections 6 and is adapted to extend in an opening of the felly 4 to prevent the sections 6 from creeping on the rim 5.

From the foregoing description taken in connection with the accompanying drawings, it will be noted that a novel form of an auxiliary protector has been provided, which can be readily applied to an ordinary wheel, when the pneumatic shoe or casing becomes disabled, and which can be readily removed and folded into a compact article, permitting the same to be stored in a considerable small space.

While I have shown and described the preferred embodiment of my invention, it will be understood that minor changes in construction, combination and arrangement of parts may be made without departing from the spirit and scope of the invention as claimed.

Having thus described my invention, what I claim is:

1. A folding automobile rim protector comprising a plurality of tread sections, substantially U-shaped members embedded within said sections, means for pivotally connecting said members together, and means connected to a pair of said members for tightly clamping the tread sections about the rim of a wheel.

2. A folding automobile rim protector comprising a plurality of tread sections, substantially U-shaped members embedded within said sections and having the webs and ends of the arm portions disposed exteriorly of the ends of the sections, hooks formed on the ends of the arm portions of some of said sections and adapted to engage the web portions of the U-shaped members of the next adjacent sections, and means connected to the U-shaped members for tightly clamping the sections upon the rim of a wheel.

3. A folding automobile rim protector comprising a plurality of tread sections, members embedded within said sections, means for pivotally connecting said members, a transverse rod journaled to one of said members, arms carried by said rod, links pivoted to said arms, and to one of the other of said members, and levers secured to said rod for rotating said rod to tightly clamp the sections about the rim of a wheel.

4. A rim protector comprising a plurality of tread sections positioned about the periphery of the wheel, one of said sections having a slot opening out of one end and through the tread face thereof, members embedded in said sections and the adjacent ends of two of said members being disposed in the slot, means connecting the other members together, a rod secured to one of said members in the slot, an arm carried by said rod, a link pivoted to said arm and to the other member located in said slot, and a lever secured to the rod adapted to be swung within the slot to clamp the sections together about the wheel.

In testimony whereof I affix my signature in presence of two witnesses.

JOSEPH J. SHOEMAKER.

Witnesses:
 LOUIS ONEAL,
 MAURICE J. RANKIN.

Copies of this patent may be obtained for five cents each, by addressing the "Commissioner of Patents, Washington, D. C."